J. A. MARKS.
FISHING FLOAT.
APPLICATION FILED MAY 22, 1920.
1,361,602.
Patented Dec. 7, 1920.
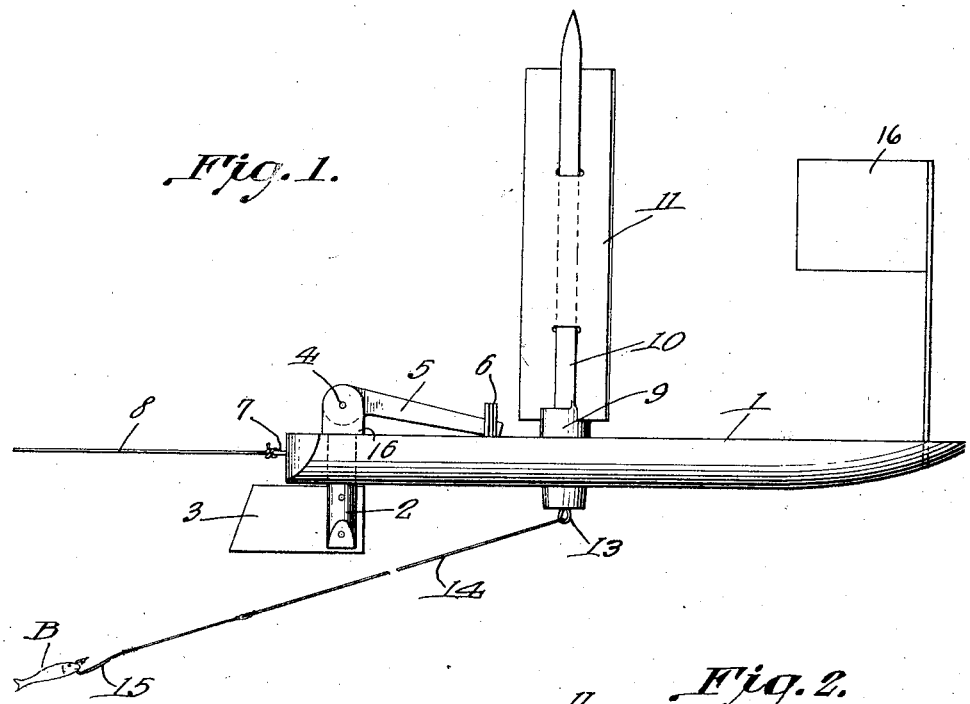
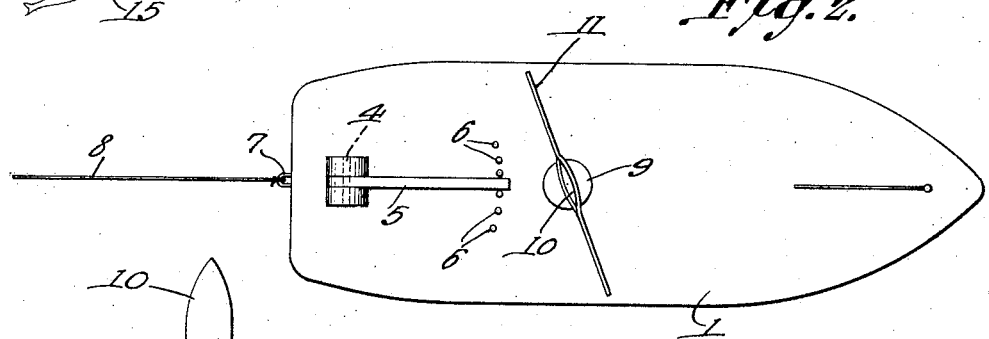
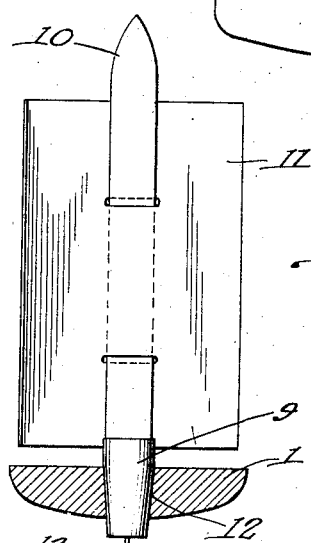
Inventor
John A. Marks
By Jerry A Mathews
and Lester L Sargent
Attorney

UNITED STATES PATENT OFFICE.

JOHN A. MARKS, OF BATAVIA, WISCONSIN.

FISHING-FLOAT.

1,361,602.

Specification of Letters Patent.   Patented Dec. 7, 1920.

Application filed May 22, 1920.  Serial No. 383,459.

*To all whom it may concern:*

Be it known that I, JOHN A. MARKS, a citizen of the United States, residing at Batavia, in the county of Sheboygan and State of Wisconsin, have invented a new and useful Fishing-Float, of which the following is a specification.

The object of my invention is to provide a novel float which will carry the bait out some distance from the shore where the larger fish may be caught; and to provide novel means for steering such a float. I attain the object of my invention by the device illustrated in the accompanying drawings, in which—

Figure 1 is a side elevation of the device as it appears in use;

Fig. 2 is a top plan of same;

Fig. 3 is a transverse section through the portion of the hull containing the mast, with the mast shown in elevation.

Like numerals designate like parts in each of the views.

Referring to the accompanying drawings, I provide a float with a conventional boat-shaped hull 1, having an eye 7 attached to its stern, to which the fishing or trolling line 8 is secured. Swingably mounted in the stern of the hull is a rudder post 2, to which is fixed a rudder 3. The rudder arm 5 is pivoted for vertical movement on the rudder post 2 by pivot 4. I provide a series of spaced pins 6 in the hull in proximity to the end of the rudder arm 5, between any two of which pins the end of the rudder arm 5 may be releasably engaged for holding the rudder in the desired adjusted position to steer the float in the desired direction. I provide a downwardly tapered opening 12 through the hull 1 adapted to receive the tapered base or foot 9 of the knife-shaped mast 10, to which member is attached the sail 11. Secured to the bottom of member 9 is an eye 13 to which is attached the bait cord 14, to which is attached the hook 15, carrying bait B as illustrated in Fig. 1. Rudder arm 5 may be swung clear of the pins and the rudder left loose if desired. Post 2 has an annular shoulder 16. I may provide a suitable flag 16, as shown.

In operation the mast and rudder are set at the appropriate angle to steer the float in the direction desired when it is launched. The float, propelled by the wind, will carry the bait to a distance farther from the shore than would otherwise be possible, and for any distance desired, thus increasing the chances of catching big fish. The pins which engage the rudder arm hold it, and consequently the rudder at the desired angle to steer the float. The base or foot 9 of the mast being tapered permits of its being readily removed from the hull so that the device may be conveniently packed for transportation. Not the least important of the advantages of the float is the fact that it carries the bait along giving it a more life-like appearance in consequence of its motion through the water and without any noise which might startle and frighten away the fish.

What I claim is:

In a fishing float, the combination of a boat-like hull to the stern of which a trolling line is attached, a mast and sail comprising a knife-shaped mast carrying a sail of stiff material, the mast having an annular downwardly tapered base, removably mounted in a correspondingly shaped opening in the hull and carrying a baitline and hook, an adjustable rudder and rudder post, a rudder arm pivotally mounted on the upper end of the rudder post, means for engaging the end of the rudder arm in any of several positions to hold the rudder adjusted at an angle suitable for steering the float in any desired direction.

JOHN A. MARKS.